United States Patent Office 3,045,027
Patented July 17, 1962

3,045,027
PREPARATION OF ETHYLENE SULFATE
George E. Ham, Lake Jackson, Tex., assignor to The Dow Chemical Company, Midland, Mich., a corporation of Delaware
No Drawing. Filed Aug. 3, 1959, Ser. No. 830,990
13 Claims. (Cl. 260—327)

The present invention relates to a new and useful method for preparing alkylene sulfates and is more particularly concerned with a novel process which employs readily available starting materials for preparing alkylene sulfates, particularly ethylene sulfate and polymers thereof.

One prior known method for the preparation of ethylene sulfate is the reaction of ethylene dibromide and silver sulfate. One of the major drawbacks to this process is the employment of expensive reactants. Therefore, it would be advantageous to provide a process which employs less expensive reactants.

It is an object of the present invention to provide a process for making alkylene sulfates which employs readily available starting materials. A further object of the present invention is to provide a process which employs inexpensive reactants. These and other objects will become apparent to those skilled in the art from the following specification and claims.

It has now been found that alkylene sulfates can be prepared by reacting an alkylene oxide having from 2 to 5 carbon atoms, inclusive, with sulfur trioxide in 1,4-dioxane or p-oxathiane (solvents which form a complex with the $SO_3$). Conveniently, the sulfur trioxide is slowly mixed with the 1,4-dioxane or p-oxathiane at a temperature of from 10° C. to 25° C., and then alkylene oxide slowly passed into the mixture. Good results are obtained when the reactants are employed in substantially equimolecular proportions. The desired product is obtained from the reaction mixture by fractional distillation, sublimation or the like.

In accordance with the present invention, one manner of carrying out the process comprises adding slowly in a dropwise manner sulfur trioxide to 1,4-dioxane or oxathiane with stirring and cooling. The addition results in an exothermic rise in temperature necessitating the employment of external cooling to maintain the temperature of the reaction mixture from about 10° to about 25° C. During the addition a precipitate forms which is believed to be an addition product of the sulfur trioxide and the 1,4-dioxane or oxathiane. Upon completion of the addition of sulfur trioxide an alkylene oxide, such as ethylene oxide, is slowly passed into the solvent —$SO_3$ reaction mixture. When approximately an equimolecular quantity of the alkylene oxide, based on sulfur trioxide, has been added, the solvent —$SO_3$ precipitate which had formed substantially completely dissolves. The addition of the alkylene oxide can be continued until a 5 to 10 or more percent excess of oxide has been added. Upon completion of the addition of the alkylene oxide, the reaction mixture is distilled under vacuum to remove the solvent and recover a viscous liquid which on sublimation under vacuum yields the appropriate alkylene sulfate.

The alkylene oxides which can be employed in accordance with the present invention are the lower vicinal alkylene oxides from 2 to 5 carbon atoms, inclusive. Some of such compounds are, for example, ethylene oxide, 1,2-propylene oxide, 1,2-butylene oxide, 1,2-isobutylene oxide, 2,3-butylene oxide, 1,2-pentylene oxide, and the like.

The solvents which can be employed in accordance with the present invention are those organic solvents, which form with sulfur trioxide a complex or addition product, and which complex or addition product will dissociate under the conditions hereinbefore set forth to free the $SO_3$ for reaction with the alkylene oxide. Two known compounds which are operative in the method of the present invention and which form the aforesaid complex or addition product are 1,4-dioxane and para-oxathiane.

The following examples illustrate the present invention but are not to be construed as limiting:

*Example 1*

Dry, redistilled 1,4-dioxane (200 ml.) was cooled and 19.3 g. (0.25 mole) of sulfur trioxide was added dropwise with stirring. By controlling the rate of addition and keeping the mixture cool (ca. 10° C.) the sulfur trioxide could be added in this manner with no charring. During the addition the sulfur trioxide-dioxane addition compound precipitated. After addition was complete, ethylene oxide was passed into the mixture slowly with cooling and stirring. When approximately 0.25 mole of ethylene oxide had been added, the precipitated addition compound had dissolved and the reaction mixture was a homogeneous solution. Ethylene oxide addition was continued until 0.44 mole had been added. The reaction was mildly exothermic. The volume of the reaction mixture was 210 ml.

The 1,4-dioxane was removed from 160 ml. of the reaction mixture by distillation under vacuum. The residue was placed in a sublimation apparatus and the product sublimed at 3 mm. and 60–70°. The white crystalline product, identified as ethylene sulfate, had the following properties: M.P. 96–97° C. Analysis: Found, C, 19.86; H, 3.36. Calculated for $C_2H_4O_4S$, C, 19.35; H, 3.25.

*Example 2*

In the manner of Example 1 employing para-oxathiane in place of 1,4-dioxane there is obtained an ethylene sulfate product having substantially identical properties as that obtained in Example 1.

I claim:

1. A method for preparing alkylene sulfates which comprises reacting sulfur trioxide with a lower vicinal alkylene oxide having from 2 to 5 carbon atoms, inclusive, at a temperature between 10° and about 25° C. said reaction being carried out in the presence of a solvent selected from the group consisting of 1,4-dioxane and para-oxathiane.

2. A method for preparing alkylene sulfates which comprises the steps of reacting sulfur trioxide with 1,4-dioxane at a temperature from about 10° to about 25° C. to produce a dioxane-sulfur trioxide addition complex; subsequently reacting the so formed complex with a lower vicinal alkylene oxide having from 2 to 5 carbon atoms, inclusive at a temperature between about 10° C. and about 25° C.

3. A method for preparing alkylene sulfates which comprises the steps of reacting sulfur trioxide with para-oxathiane at a temperature of from about 10° to about 25° C. to produce a para-oxathiane-sulfur trioxide addition complex; subsequently reacting the so formed complex with a lower vicinal alkylene oxide having from 2 to 5 carbon atoms, inclusive at a temperature between about 10° C. and about 25° C.

4. The method of claim 2 wherein said alkylene oxide is ethylene oxide.

5. The method of claim 2 wherein said alkylene oxide is propylene oxide.

6. The method of claim 2 wherein said alkylene oxide is butylene oxide.

7. The method of claim 2 wherein said alkylene oxide is 1,2-pentylene oxide.

8. The method of claim 2 wherein said alkylene oxide is isobutylene oxide.

9. The method of claim 3 wherein said alkylene oxide is ethylene oxide.

10. The method of claim 3 wherein said alkylene oxide is propylene oxide.

11. The method of claim 3 wherein said alkylene oxide is butylene oxide.

12. The method of claim 3 wherein said alkylene oxide is 1,2-pentylene oxide.

13. The method of claim 3 wherein said alkylene oxide is isobutylene oxide.

References Cited in the file of this patent

UNITED STATES PATENTS

| | | |
|---|---|---|
| 2,684,977 | Viard | July 27, 1954 |
| 2,805,228 | Smith | Sept. 3, 1957 |

FOREIGN PATENTS

| | | |
|---|---|---|
| 1,029,382 | Germany | May 8, 1958 |
| 1,049,870 | Germany | Feb. 5, 1959 |